Patented Mar. 12, 1929.

1,704,983

UNITED STATES PATENT OFFICE.

ARTHUR LÜTTRINGHAUS, OF MANNHEIM, HEINRICH NERESHEIMER, OF LUDWIGS-HAFEN-ON-THE-RHINE, AND HUGO WOLFF, OF MANNHEIM, GERMANY, ASSIGNORS TO GRASSELLI DYESTUFF CORPORATION, OF NEW YORK, N. Y., A CORPORATION OF DELAWARE.

DYESTUFF OF THE ISODIBENZANTHRONE SERIES.

No Drawing. Original application filed October 16, 1925, Serial No. 62,934, and in Germany October 25, 1924. Divided and this application filed December 9, 1926. Serial No. 153,724.

The subject matter of this application has been divided out from our copending application Serial No. 62,934, filed October 16, 1925, with the express intention to apply for this divisional application.

As we have shown in our said parent application, new members of the class of isodibenzanthrones can be obtained by condensation with the aid of alkaline condensing agents of mixtures of Bzl-halogen-benzanthrones and benzanthrone itself or such derivatives thereof as possess a free Bzl-position. Generally, about equimolecular amounts of the Bzl-halogen compound and the Bzl-unsubstituted compound will be chosen, but an excess of the Bzl-halogen-benzanthrone may also be employed. Various alkaline condensing agents suitable for effecting condensations of the kind in question may be used, but as a particularly suitable condensing medium we mention mixtures of caustic alkalis and alkali metal alcoholates in the presence of an inert diluent. Such mixtures can be readily prepared from a caustic alkali and a restricted quantity of an alcohol, and the benzanthrone bodies and the diluent may already be present when mixing the alkali and alcohol. Oxygen should be excluded as far as possible, to which end a current of an inert gas is passed through the mixture or vessel during the reaction. Very good yields are also obtained with metal arylides as condensing agents. In all cases the benzanthrone as well as the Bzl-halogen-benzanthrone body must also contain the 2-position unsubstituted.

The said process permits of obtaining also unsymmetrically substituted isodibenzanthrones by starting from a benzanthrone and a Bzl-halogen-benzanthrone, only one of which contains a further substituent, or which contain different substituents, or the same substituents, but in different positions.

Isodibenzanthrones can also be obtained by subjecting the intermediary products of the reaction between a benzanthrone and a Bzl-halogen-benzanthrone, viz, 2.Bzl'-dibenzanthronyls, of which the 2-Bzl'-dibenzanthronyl itself corresponds to the formula

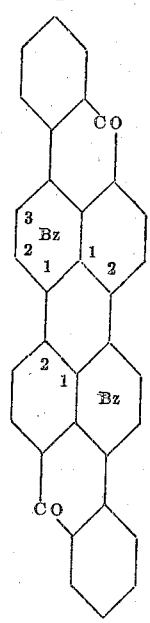

to the action of condensing agents of an alkaline or acid nature. Such agents may at the same time be halogenating agents when in some cases halogenated dyestuffs will be obtained.

The aforesaid invention is more fully explained by the following examples to which however the invention is not limited. The parts are by weight.

Example 1.

10 parts of 2.Bzl'-dibenzanthronyl prepared for example in accordance with Examples 1 and 3 of application Serial No. 62,934, filed October 16, 1925, are added at about 125° C. to a suspension of sodium anilide in aniline prepared from 3 parts of metallic sodium and 200 parts of dry aniline in a current of nitrogen. The mixture is heated to 140° to 150° C. until the formation of dyestuff is finished. When cool, the blue violet coloured mass is poured into dilute hydrochloric acid. The isodibenzanthrone precipitated is filtered off, washed and dried and may be purified by boiling with organic solvents. It corresponds to the formula

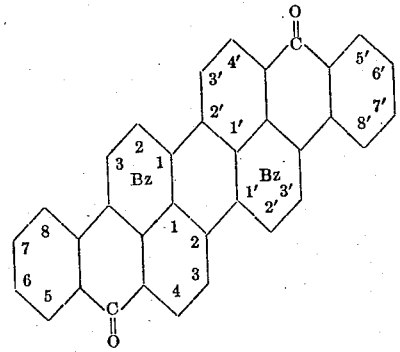

and forms a dark powder of metallic lustre which dissolves in concentrated sulfuric acid pure green.

*Example 2.*

10 parts of 2.Bzl'-dibenzanthronyl are slowly introduced at about from 130° to 135° C. into a solution of 40 parts of caustic potash in 40 parts of absolute alcohol, care being taken that the temperature does not exceed 135° C. The mixture is then kept at from 135° to 140° C. for about half an hour, poured into water and boiled while introducing a current of air until all of the dyestuff is precipitated. It is filtered off, washed and dried. Pure isodibenzanthrone is obtained in a nearly theoretical yield.

When using 6-methyl-2.Bzl'-dibenzanthronyl (see Example 2 of application Serial No. 62,934), instead of 2.Bzl'-dibenzanthronyl, 6-methyl-isodibenzanthrone corresponding to the formula

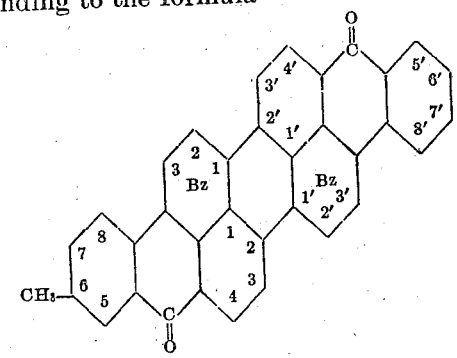

is obtained which dyes cotton more bluish shades than isodibenzanthrone.

6-chlor-2.Bzl'-dibenzanthronyl may be used in the same manner forming 6-chlor-isodibenzanthrone corresponding to the formula

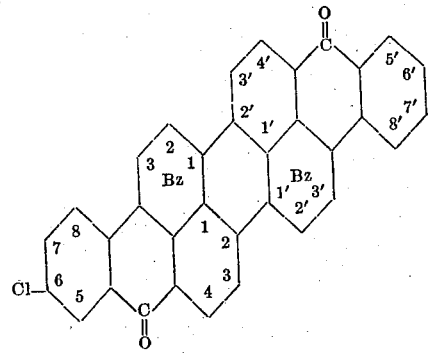

which dyes cotton considerably bluer and stronger shades than isodibenzanthrone.

*Example 3.*

A mixture of 3 parts of 2.Bzl'-dibenzanthronyl with 20 parts of anhydrous ferric chlorid and 15 parts of dry common salt is heated to about 250° C. until a test portion of the mass, after being treated with dilute hydrochloric acid, is totally soluble to a vat. The dyestuff so obtained contains chlorine and dyes the fibre from a blue vat strong blue violet shades.

With aluminium chlorid instead of ferric chlorid, at about 300° C. isodibenzanthrone is obtained. The latter can also be prepared by heating 2.Bzl'-dibenzanthronyl with sulfuric acid of 80 per cent strength in the presence of mercury salts.

*Example 4.*

Into a solution of 40 parts of sodium in 300 parts of anhydrous alcohol, heated to 105° to 110° C. while distilling off part of the alcohol, a mixture of 13 parts of Bzl-brom-benzanthrone and 7 parts of benzanthrone is introduced while stirring and the said temperature kept for 3 hours. The blue mass is boiled with a large quantity of water and an addition of sodium hydrosulfite and the resulting blue vat filtered and the dyestuff precipitated by means of air. Practically pure isodibenzanthrone is obtained.

When employing a mixture of 10 parts of Bzl'-brom-benzanthrone and 10 parts of 6-chlor-benzanthrone (see Berichte der Deutschen Chemischen Gesellschaft, vol. 55, page 114) in the same manner, 6-chlor-isodibenzanthrone as described in Example 2, third paragraph, is obtained.

*Example 5.*

23 parts of sodium are finely divided by shaking with 300 parts of xylene at 110° to 120° C., and 46 parts of absolute alcohol are added to the suspension while stirring well and, if necessary, while cooling. When the sodium is dissolved, 70 parts of finely pulverized cautic potash and then, while carefully excluding air, 12 parts of pure Bzl-chlor-benzanthrone and 8 parts of pure benzanthrone are added. The mixture is gradually heated to 70° to 75° C. and stirred at this temperature until the violet blue color of the paste becomes no longer darker and is then treated with steam in order to drive off xylene and alcohol. Isodibenzanthrone is obtained in much better yield than when employing all of the benzanthrone in the form of the Bzl-chlor derivative.

If instead of benzanthrone 6-methyl-benzanthrone (see Annalen, vol. 394, page 147) is used, 6-methyl-isodibenzanthrone is obtained (see Example 2).

Example 6.

30 parts of isopropyl alcohol are added at 10° to 15° C., while stirring and excluding air, to a mixture of 300 parts of benzene, 70 parts of powdered caustic potash, 11 parts of pure Bzl-chlor-benzanthrone and 9 parts of pure benzanthrone. After stirring the mixture for some hours, and driving off the solvent, the dyestuff can be obtained in the manner described in Example 4.

Mixtures of Bzl-chlor-benzanthrone and benzanthrone may also be prepared by partially chlorinating benzanthrone.

Example 7.

While stirring and excluding air as far as possible, 24 parts of ethyl alcohol are added to a suspension consisting of 300 parts of benzene, 70 parts of finely pulverized caustic potash, 11 parts of Bzl-chlor-benzanthrone (Fp 176° see U. S. Patent 906,367) and 9 parts of 6-chlor-benzanthrone, at 70° to 75° C. and stirred at this temperature for one to two more hours. After driving off the solvent, the product is dissolved in water whereby a blue solution is formed from which the dyestuff is precipitated by means of a current of air. A dyestuff practically identical with that of Example 2, third paragraph, is obtained in a very good yield.

Example 8.

An intimate mixture of 10 parts of Bzl-chlor-benzanthrone and 10 parts of 6-chlor-benzanthrone is introduced while stirring at 70° C. into a mixture of 15 parts of sodium anilide and 200 parts of dry aniline in a current of nitrogen. The temperature rises to about 90° C. and is kept at this height until the formation of the dyestuff is finished. The mass is then poured into dilute hydrochloric acid whereupon the brown red precipitate is filtered off, washed and dried. The 6-chlor-isodibenzanthrone may be purified by boiling it with organic solvents, for example acetone, nitrobenzene and the like.

The reaction may also be carried out at a higher or lower temperature. In the latter case, for example at 15° to 20° C., 6-chlor-isodibenzanthrone and 6-chlor-2.Bzl'-dibenzanthronyl are formed simultaneously.

Example 9.

By the condensation of 6-Bzl-dichlor-benzanthrone (which may be obtained by treating 6-chlor-benzanthrone with sulfuryl chlorid and forms yellow needles melting at 262° to 264° C. and which by the oxidation with chromic acid forms a chlor-anthraquinone carboxylic acid the amide of which can be transformed in the usual manner into 1-amino-6-chlor-anthraquinone) with benzanthrone by means of sodium anilide, 6-chlor-isodibenzanthrone is also obtained.

Example 10.

A mixture of 12 parts of 6-brom-Bzl-chlor-benzanthrone (yellow needles melting at 254° to 255° C. which can be prepared by treating Bzl-chlor-benzanthrone with bromine or from 6-brom-benzanthrone and sulfuryl chlorid) and 8 parts of benzanthrone, when treated in a similar manner, gives a violet blue vat dyestuff consisting substantially of 6-brom-isodibenzanthrone.

Example 11.

By treating a mixture of 8-chlor-benzanthrone (yellow needles melting at 174° C. which may be prepared by fractional crystallization of the product obtained by the reaction of glycerol and sulfuric acid on 1-chlor-anthraquinone in the presence of aniline sulfate (see U. S. Patent 809,894) and which when oxidized forms a chlor-anthraquinone carboxylic acid capable of being transformed to 1-amino-8-chlor-anthraquinone) and Bzl-chlor-benzanthrone with sodium anilide in the manner described in Example 8, 8-chlor-isodibenzanthrone corresponding to the formula

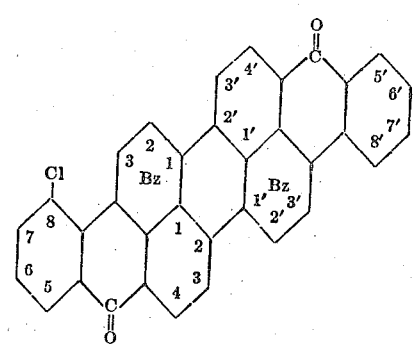

is obtained which dyes cotton from the vat very fast strong reddish violet shades.

Instead of 8-chlor-benzanthrone and Bzl-chlor-benzanthrone, a mixture of benzanthrone and 8.Bzl-dichlor-benzanthrone (yellow needles melting at 218° to 220° C. prepared from 8-chlor-benzanthrone and sulfuryl chlorid) may be used as well.

Example 12.

By condensing a mixture of 10 parts of 8.Bzl-dichlor-benzanthrone and 9 parts of 8-chlor-benzanthrone in the manner described in Example 8, 8.8'-dichlor-isodibenzanthrone corresponding to the formula

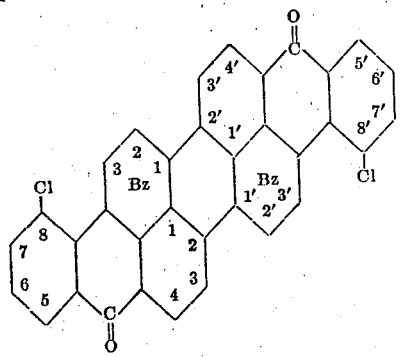

is obtained which dyes cotton still more reddish shades than 8-chlor-isodibenzanthrone.

We claim:—

1. As new articles of manufacture, isodibenzanthrones containing at least one substituent free from nitrogen but not more than one halogen radical in the molecule unless a non-haloid substituent is present.

2. As new articles of manufacture, monohalogen-isodibenzanthrones, dissolving in concentrated sulfuric acid with a green coloration and giving with alkaline hydrosulfite solution a blue vat from which cotton is dyed reddish violet to violet blue shades.

3. As new articles of manufacture, 6-chlor-isodibenzanthrone containing between about 6 per cent to 7 per cent of chlorine, dissolving in concentrated sulfuric acid with a green coloration, and in alkaline hydrosulfite solution to a blue vat from which cotton is dyed violet blue shades.

4. The process of manufacturing vat coloring matters of the benzanthrone series which consists in treating a mixture of a benzanthrone body, not substituted in 2- and in Bzl-position with a Bzl-halogen-benzanthrone body with a free 2-position, with an alkaline condensing agent until the formation of dyestuff has taken place.

5. The process of manufacturing vat coloring matters of the benzanthrone series which consists in condensing the intermediary product of an incomplete alkaline condensation of about equimolecular proportions of a benzanthrone body with free 2- and Bzl-positions and a Bzl-halogen-benzanthrone with free 2-position, said intermediary product having still free Bzl'- and 2-positions, with an alkaline condensing agent until a vat coloring matter is produced.

In testimony whereof we have hereunto set our hands.

ARTHUR LÜTTRINGHAUS.
HEINRICH NERESHEIMER.
HUGO WOLFF.